J. HUDSON.
Horse Rake.

No. 94,889. Patented Sept. 14, 1869.

Witnesses

Inventor
Jesse Hudson
per Alexander Mason
Attys

United States Patent Office.

JESSE HUDSON, OF CHARLESTON, ILLINOIS.

Letters Patent No. 94,889, dated September 14, 1869.

IMPROVEMENT IN HORSE-RAKES.

The Schedule referred to in these Letters Patent and making part of the same.

*To all whom it may concern:*

Be it known that I, JESSE HUDSON, of Charleston, in the county of Coles, and in the State of Illinois, have invented new and useful Improvements in Hay-Rakes; and do hereby declare that the following is a full, clear, and exact description thereof, reference being had to the accompanying drawings, and to the letters of reference marked thereon.

The object of my invention is to provide a hay-rake much larger than those of the ordinary make and size, and yet shall be so simple in its construction that they can be just as easily managed as the small ones.

As far as the construction of the body of the rake is concerned, it is similar to those of the usual construction and shape, only, as this is more especially intended for work upon fields of immense size, or upon the prairies, the beam between the wheels is intended to vary from fifteen feet and upward, while the prongs are to be about eight feet in length.

The ends of the beam $a$ are made to extend out beyond the driving-wheels, so as to attach the horses to them, one upon each side. For this purpose, these axles should be made of iron, and have a hole pierced through at each end, so that a link or staple can be bolted on, of sufficient size, so as to allow them to swing freely around the axle, in order that the rake can be drawn in either direction.

Extending upward from the beam $a$, there are three uprights, those two at the ends being used for levers upon which the two arms C are secured.

These two outer uprights have a deep slot cut in their tops, large enough to receive the arms C, and, in order to adjust these arms to the height of the rider, a number of holes have been made in their sides, one above the other, so that the arms can be adjusted, by means of a bolt passing through, at any desired height.

Extending across these three uprights, there is a bar placed, which not only gives greater strength to them, but also prevents the hay from slipping back over the prongs.

Figure 1:
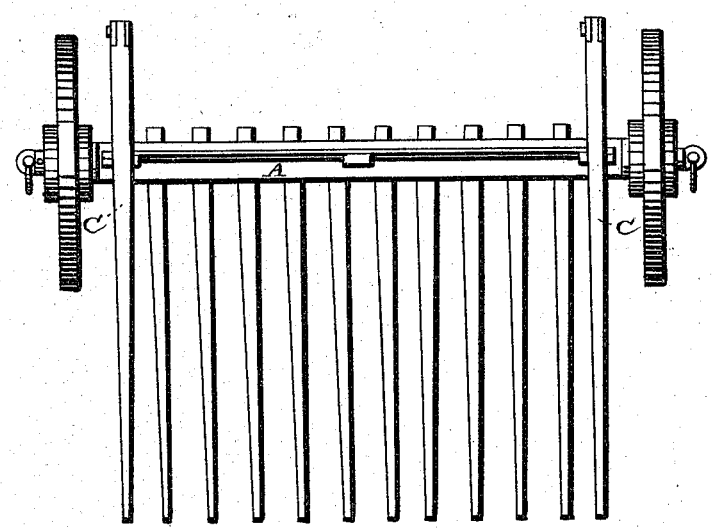
Figure 1 is a plan view of my rake.
Figure 2:
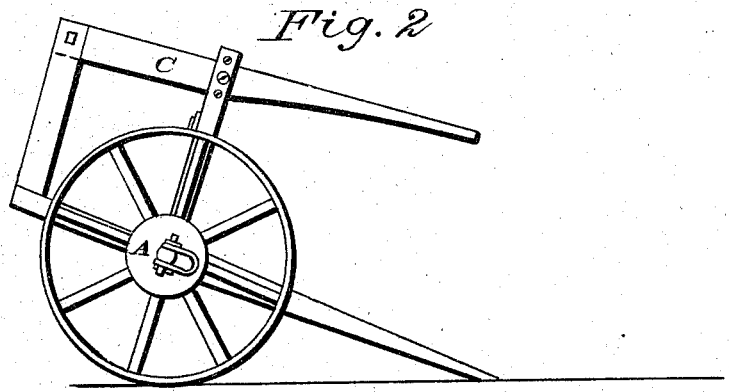
Figure 2 is a side elevation of the same.

By means of the two arms the prongs can be lifted up from the ground, so as to clear any obstruction in front of them. The two outside prongs are longer than the other ones, and are made to extend backward through the beam $a$, as seen in fig. 2. To these two ends there are secured upright posts, slotted upon their tops, and in which the ends of the arms are pivoted.

It is intended to attach a horse to each end of the beam, and a rider upon each horse, so as to raise the prongs by means of the arms, whenever they catch in any obstructions. As soon as the rake is loaded, the drivers turn their horses about, and draw it backward, leaving the hay all in a pile, when they are again ready to go forward.

Having thus described my invention,

What I claim, and desire to secure by Letters Patent, is—

1. The arms C C, so arranged as to operate the prongs of the hay-rake over obstructions, substantially as set forth.

2. The combination of the elongated axle A with the projecting tines, and the pivoted arms C C, all substantially as set forth.

In testimony that I claim the foregoing, I have hereunto set my hand, this 17th day of March, 1869.

JESSE HUDSON.

Witnesses:
 LAFAYETTE CRAIG,
 LEOPOLD EVERT.